United States Patent
Shaw et al.

(10) Patent No.: US 11,042,825 B2
(45) Date of Patent: Jun. 22, 2021

(54) ASSESSMENT SYSTEM AND METHOD

(71) Applicants: Benjamin F. Shaw, Plano, TX (US); Timothy D. Brennan, Halifax (CA); David Pothier, Halifax (CA); Jan G. Van der Hoop, Oakville (CA)

(72) Inventors: Benjamin F. Shaw, Plano, TX (US); Timothy D. Brennan, Halifax (CA); David Pothier, Halifax (CA); Jan G. Van der Hoop, Oakville (CA)

(73) Assignee: Fit First Holdings Inc. a Nova Scotia Corporation

( * ) Notice: Subject to any disclaimer, the term of this patent is extended or adjusted under 35 U.S.C. 154(b) by 1214 days.

(21) Appl. No.: 14/993,432

(22) Filed: Jan. 12, 2016

(65) Prior Publication Data

US 2016/0203432 A1 Jul. 14, 2016

Related U.S. Application Data

(60) Provisional application No. 62/102,334, filed on Jan. 12, 2015.

(51) Int. Cl.
| | | |
|---|---|---|
| *G06Q 10/00* | (2012.01) | |
| *G06Q 10/06* | (2012.01) | |
| *G09B 7/02* | (2006.01) | |
| *G06Q 10/10* | (2012.01) | |
| *G06N 3/10* | (2006.01) | |

(52) U.S. Cl.
CPC ....... *G06Q 10/06393* (2013.01); *G06Q 10/06* (2013.01); *G06Q 10/06398* (2013.01); *G06Q 10/10* (2013.01); *G06Q 10/1053* (2013.01); *G09B 7/02* (2013.01); *G06N 3/10* (2013.01)

(58) Field of Classification Search
None
See application file for complete search history.

(56) References Cited

U.S. PATENT DOCUMENTS

| | | |
|---|---|---|
| 5,551,880 A | 9/1996 | Bonnstetter et al. |
| 5,597,311 A | 1/1997 | Yanagida et al. |
| 6,070,143 A | 5/2000 | Barney et al. |
| 6,272,467 B1 | 8/2001 | Durand et al. |
| 6,385,620 B1 | 5/2002 | Kurzius et al. |
| 6,618,734 B1 | 9/2003 | Williams et al. |
| 7,778,938 B2 | 8/2010 | Stimac |
| 7,945,522 B2 * | 5/2011 | McGovern ............ G06Q 10/10 705/320 |

(Continued)

*Primary Examiner* — Gurkanwaljit Singh
(74) *Attorney, Agent, or Firm* — Jason P. Webb; Pearson Butler

(57) ABSTRACT

An assessment system and method configured to automatically assess an individual and an associated job using a computing device. The system includes a benchmark module that stores a benchmark associated with a job. The benchmark includes both minimum threshold scores and maximum threshold scores associated with particular characteristics. The system includes an electronic library of questions associated with an array of characteristics. The system includes a survey module functionally coupled to the electronic library and the benchmark module that automatically performs an assessment by automatically selecting questions from the electronic library based on the benchmark and applying such questions to an individual using a user interface module.

12 Claims, 7 Drawing Sheets

(56) References Cited

U.S. PATENT DOCUMENTS

| | | | |
|---|---|---|---|
| 8,112,365 B2 | 2/2012 | Foster | |
| 8,156,051 B1 | 4/2012 | Shah et al. | |
| 8,543,414 B2 | 9/2013 | Iwano et al. | |
| 8,620,829 B2* | 12/2013 | McGovern | G06Q 10/1053 |
| | | | 705/321 |
| 10,726,377 B2* | 7/2020 | Volkov | G06Q 10/063112 |
| 2001/0049674 A1 | 12/2001 | Talib et al. | |
| 2002/0065709 A1 | 5/2002 | MacKenzie | |
| 2002/0169631 A1 | 11/2002 | Lewis | |
| 2003/0050811 A1 | 3/2003 | Freeman, Jr. et al. | |
| 2003/0129575 A1* | 7/2003 | L'Allier | G09B 7/02 |
| | | | 434/362 |
| 2003/0212909 A1 | 11/2003 | Chandrashekhar et al. | |
| 2004/0138903 A1 | 7/2004 | Zuniga | |
| 2005/0060318 A1 | 3/2005 | Brickman, Jr. | |
| 2005/0276396 A1 | 12/2005 | Bernard et al. | |
| 2006/0080128 A1 | 4/2006 | Brown et al. | |
| 2006/0105306 A1* | 5/2006 | Sisney | G09B 7/02 |
| | | | 434/236 |
| 2006/0106636 A1* | 5/2006 | Segal | G06Q 10/10 |
| | | | 705/321 |
| 2006/0229896 A1* | 10/2006 | Rosen | G06Q 10/1053 |
| | | | 705/321 |
| 2006/0229902 A1* | 10/2006 | McGovern | G06Q 50/10 |
| | | | 705/321 |
| 2007/0282765 A1* | 12/2007 | Visel | G06N 3/10 |
| | | | 706/14 |
| 2008/0208665 A1 | 8/2008 | Bull et al. | |
| 2008/0208907 A1 | 8/2008 | Tolve et al. | |
| 2009/0319344 A1* | 12/2009 | Tepper | G06Q 10/06393 |
| | | | 705/7.39 |
| 2011/0276356 A1* | 11/2011 | Smith | G06Q 10/1053 |
| | | | 705/7.13 |
| 2012/0124052 A1* | 5/2012 | Furey | G06Q 10/00 |
| | | | 707/740 |

* cited by examiner

|  |  | SCALE SCORE (1-10 HERE FOR SIMPLICITY) | | | | | | | | | |
|---|---|---|---|---|---|---|---|---|---|---|---|
|  |  | 1 | 2 | 3 | 4 | 5 | 6 | 7 | 8 | 9 | 10 |
| EXAMPLE 1 | 10 HIGH PERFORMERS | 3 | 4 | 3 |  |  |  |  |  |  |  |
|  | 10 LOW PERFORMERS |  |  |  |  |  |  |  | 2 | 5 | 3 |
|  |  |  |  |  |  |  |  |  |  |  |  |
| EXAMPLE 2 | 10 HIGH PERFORMERS | 3 | 1 | 2 |  | 1 |  | 2 |  | 1 |  |
|  | 10 LOW PERFORMERS | 1 |  | 4 | 1 |  | 1 |  | 2 |  | 1 |

FIG. 5

|  | SCALE SCORE (1-10 HERE FOR SIMPLICITY) | | | | | | | | | |
|---|---|---|---|---|---|---|---|---|---|---|
|  | 1 | 2 | 3 | 4 | 5 | 6 | 7 | 8 | 9 | 10 |
| EXAMPLE 1 |  |  |  |  |  |  |  | X |  |  |
|  |  |  |  |  |  |  |  |  |  |  |
| EXAMPLE 2 |  | X |  |  |  |  |  |  |  |  |

FIG. 6

ASSESSMENT SYSTEM AND METHOD

CROSS-REFERENCE TO RELATED APPLICATIONS

This invention claims priority, under 35 U.S.C. § 120, to the U.S. Provisional Patent Application No. 62/102,334 to Benjamin F. Shaw et al. filed on Jan. 12, 2015, which is incorporated by reference herein in its entirety.

BACKGROUND OF THE INVENTION

Field of the Invention

The present invention relates to assessment systems and methods, specifically an assessment system and method for assessing candidates and the like with positions and the like.

Description of the Related Art

Finding the 'right job and/or, as an employer, finding the 'right' employee are critical pursuits of most people in developed nations. There are various types of support for these pursuits.

An employment agency is an organization which matches employers to employees. In substantially all developed countries, there is a publicly funded employment agency and a multiplicity of private businesses which act as employment agencies and/or perform similar functions/services. An executive-search firm specializes in recruiting executive personnel for companies in various industries. This term may apply to job-search-consulting firms who charge job candidates a fee and who specialize in mid-to-upper-level executives. In the United States, some states require job-search-consulting firms to be licensed as employment agencies.

Some third-party recruiters work on their own, while others operate through an agency, acting as direct contacts between client companies and the job candidates they recruit. They can specialize in client relationships only (sales or business development), in finding candidates (recruiting or sourcing), or in both areas. Most recruiters tend to specialize in either permanent, full-time, direct-hire positions or in contract positions, but occasionally in more than one. In an executive-search assignment, the employee-gaining client company—not the person being hired—pays the search firm its fee.

Recruitment/hiring can be said to be the overall process of attracting, selecting and appointing suitable candidates for jobs (either permanent or temporary) within an organization. Recruitment can also refer to processes involved in choosing individuals for unpaid positions, such as voluntary roles or unpaid trainee roles. Managers, human resource generalists and recruitment specialists may be tasked with carrying out recruitment, but in some cases public-sector employment agencies, commercial recruitment agencies, or specialist search consultancies are used to undertake parts of the process. Internet-based technologies to support all aspects of recruitment have become widespread.

In situations where multiple new jobs are created and recruited for the first time, or the nature of a job has substantially changed, a job analysis might be undertaken to document the knowledge, skills, abilities and other characteristics required or sought for the job. From these relevant information is captured in such documents as job descriptions and job specifications. Often, a company already has job descriptions for existing positions. Where already drawn up, these documents may require review and updating to reflect current requirements. Prior to the recruitment stage, a person specification should be finalized to provide the recruiters with the project's requirements and objectives.

Various psychological assessments and tests can assess a variety of characteristics, including literacy, critical thinking, attention to detail, personality traits, tendencies, preferences, and the like. Tests are also available to measure physical ability. Recruiters and agencies may use applicant tracking systems to filter candidates, along with software tools for psychometric testing and performance-based assessment. In many countries, employers are legally mandated to ensure their screening and selection processes meet equal opportunity and ethical standards.

Employers are likely to recognize the value of candidates who encompass soft skills such as interpersonal or team leadership. Many companies, including multinational organizations and those that recruit from a range of nationalities, are also often concerned about whether candidates fits the prevailing company culture.

Some improvements have been made in the field. Examples of references related to the present invention are described below in their own words, and the supporting teachings of each reference are incorporated by reference herein:

U.S. Pat. No. 8,543,414, issued to Iwano et al., discloses a medical question contents automatic selection system for automatically selecting medical questions allocated to a patient from the medical questionnaire made by a medical professional. The medical question contents automatic selection system compares the correct answer rate threshold of the medical questions preset by the medical professional with the correct answer rate of the questions to the patient so as to estimate the educational level of the patient about health, compares the vital sign measurement value threshold preset by the medical professional with the vital sign measurement value of the patient so as to estimate the condition level of the patient, and automatically selects medical questions allocated to the patient depending on the educational level and the condition level of the patient. The medical question contents automatic selection system can allocate medical questions to the patient depending on the educational level of the patient about health and disorder condition level of the patient without troubling the medical professional.

U.S. Pat. No. 8,156,051, issued to Shah et al., discloses recruiting or the process of locating and qualifying potential candidates for employment is largely a manual process consuming significant resources. The employment recruiting system automates many of the services related to employment recruiting. Position advertisements and candidate resumes are stored in computer searchable data bases. A data processing device automatically searches the data base containing candidate resumes in response to a search parameter associated with a position advertisement. The system automatically contacts screens candidates.

U.S. Pat. No. 8,112,365, issued to Foster, discloses a system and method for online employment recruiting and evaluation is provided. An online, web-based environment allows employers to create job descriptions for posting on an Internet-based job search service in communication with the web-based environment, and allows for online recruitment and review of hiring candidates using a multi-phase approach. Each employer/supervisor specified by the candidate is interviewed, and the interview is recorded and is stored as part of the candidate's virtual dossier.

U.S. Patent Application Publication No.: 2004/0138903, by Zuniga, discloses an employment management tool has an employment management program. The employment management program has a notification component, an evaluation component, a form server and a process manager. A server is coupled to a data network and runs the employment management program. A database is coupled to the server.

U.S. Patent Application Publication No.: 2006/0080128, by Brow et al., discloses a method, system, and computer program receive an identification of one or more skills associated with a job. The method, system, and computer program also receive a selection of one or more questions associated with the one or more skills. In addition, the method, system, and computer program provide an interview form, which includes the selected questions for use during an employment interview.

The inventions heretofore known suffer from a number of disadvantages which include but not are not limited to one or more of: being difficult to use, taking too long, having poor quality matching, not being highly predictive of success on the job, failing to measure what matters, not saving time, not being reliable, not being customized, not being customized for a specific local job, requiring too much guess-work in the hiring process, not being focused, not being statistically valid/sound, being difficult to deploy on a massive scale, not being automatic/automated, being difficult to deploy across a large number of candidates, being limited to practical use by large scale employers only, failing to bring rigor and/or discipline to the hiring process, not being user friendly, not being standardized, and not being legally defensible.

What is needed is an assessment system and method that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available assessment systems and methods. Accordingly, the present invention has been developed to provide an effective employment assessment system and method including a processor over a computerized network.

According to one embodiment of the invention, there is an assessment system configured to automatically assess an individual and an associated job using a computing device. The system may include a benchmark module that may store a benchmark associated with a job. The benchmark may include both minimum threshold scores and maximum threshold scores associated with particular characteristics. The system may include an electronic library of questions associated with an array of characteristics.

The system may include a survey module that may be functionally coupled to the electronic library and the benchmark module that may automatically perform an assessment by automatically selecting questions from the electronic library based on the benchmark and applying such questions to an individual using a user interface module. The survey module may automatically generate a benchmark associated with a job by applying an assessment to a pool of individuals that perform that job.

The system may include an analysis module that may be functionally coupled to the survey module that analyzes application of the assessment process to the individual. The analysis module may automatically generate a report that details the analysis of the individual with respect to the job. The assessment system may include a benchmark library that may have electronic records of an array of benchmarks against which the analysis module may compare an individual. The assessment system may include an update module that may modify the benchmark based on real-time employment data from an employer.

According to one embodiment of the invention, there is a method of automatically assessing an individual and an associated job using a computing device. The method may include the step of storing a benchmark associated with a job. The method may include the step of associating a benchmark with a plurality of characteristics. The method may include the step of providing an electronic library of questions wherein the questions are associated with an array of characteristics including the plurality of characteristics that may be specifically associated with a job analysis that may be locally validated.

The method of automatically assessing an individual and an associated job using a computing device may include the step of automatically selecting questions from the electronic library of questions based on the benchmark and its associated plurality of characteristics. The method may include the step of applying the automatically selected questions to an individual. The method may include the step of automatically analyzing application of the assessment process to the individual using a computing device.

The method of automatically assessing an individual and an associated job using a computing device may include the step of automatically generating a benchmark associated with a job by applying an assessment to a pool of individuals that perform that job. The method may include the step of generating both minimum threshold scores and maximum threshold scores associated with the plurality of characteristics while associating the benchmark with the plurality of characteristics. The method may include the step of providing a benchmark library including electronic records of an array of benchmarks against which the analysis module may compare an individual and automatically applying automatically selected questions associated with each of the array of benchmarks to the individual.

The method of automatically assessing an individual and an associated job using a computing device may include the step of automatically generates a report that details the analysis of the individual with respect to the job. The method may include the step of modifying the benchmark based on real-time employment data from an employer, including real-time data regarding hiring and firing of employees within an employee pool associated with a particular benchmark. The method may include the step of automatically generates a benchmark associated with a job by applying an assessment to a pool of individuals that perform that job.

The method of automatically assessing an individual and an associated job using a computing device may include the step of generating both minimum threshold scores and maximum threshold scores associated with the plurality of characteristics while associating the benchmark with the plurality of characteristics. The method may include the step of providing a benchmark library including electronic records of an array of benchmarks against which the analysis module may compare an individual and automatically applying automatically selected questions associated with each of the array of benchmarks to the individual. The method may include the step of automatically generating a report that details the analysis of the individual with respect to the job.

The method may include the step of modifying the benchmark based on real-time employment data from an employer, including real-time data regarding hiring and firing of employees within an employee pool associated with a particular benchmark.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawing(s). It is noted that the drawings of the invention are not to scale. The drawings are mere schematics representations, not intended to portray specific parameters of the invention. Understanding that these drawing(s) depict only typical embodiments of the invention and are not, therefore, to be considered to be limiting its scope, the invention will be described and explained with additional specificity and detail through the use of the accompanying drawing(s), in which:

FIG. 5 is a chart illustrating a set of non-limiting exemplary methods of automatically benchmarking and scoring of an assessment system, according to various embodiment of the invention; and FIG. 6 is a chart illustrating a set of non-limiting exemplary methods of automatically benchmarking and scoring of an assessment system, according to various embodiment of the invention.

DETAILED DESCRIPTION OF THE INVENTION

Figure 1:
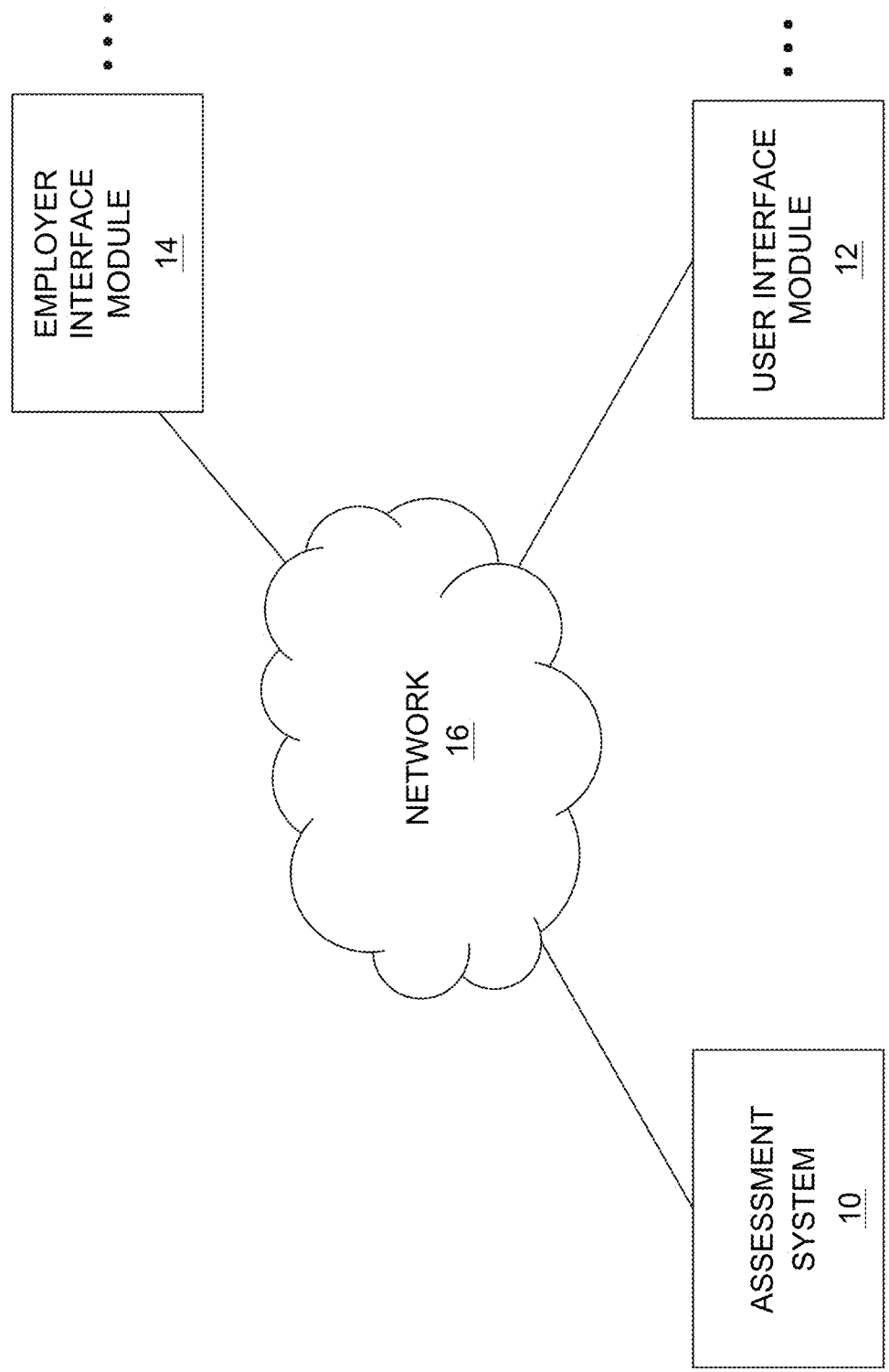
FIG. 1 is a network diagram of an assessment system over a computerized network, according to one embodiment of the invention.

For the purposes of promoting an understanding of the principles of the invention, reference will now be made to the exemplary embodiments illustrated in the drawing(s), and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Many of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. Modules may also be implemented in software for execution by various types of processors. An identified module of programmable or executable code may, for instance, comprise one or more physical or logical blocks of computer instructions which may, for instance, be organized as an object, procedure, or function.

Nevertheless, the executables of an identified module need not be physically located together, but may comprise disparate instructions stored in different locations which, when joined logically together, comprise the module and achieve the stated purpose for the module. Indeed, a module and/or a program of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The various system components and/or modules discussed herein may include one or more of the following: a host server, motherboard, network, chipset or other computing system including a processor for processing digital data; a memory device coupled to a processor for storing digital data; an input digitizer coupled to a processor for inputting digital data; an application program stored in a memory device and accessible by a processor for directing processing of digital data by the processor; a display device coupled to a processor and/or a memory device for displaying information derived from digital data processed by the processor; and a plurality of databases including memory device(s) and/or hardware/software driven logical data storage structure(s).

Various databases/memory devices described herein may include records associated with one or more functions, purposes, intended beneficiaries, benefits and the like of one or more modules as described herein or as one of ordinary skill in the art would recognize as appropriate and/or like data useful in the operation of the present invention.

As those skilled in the art will appreciate, any computers discussed herein may include an operating system, such as but not limited to: Android, iOS, BSD, IBM z/OS, Windows Phone, Windows CE, Palm OS, Windows Vista, NT, 95/98/2000, OS X, OS2; QNX, UNIX; GNU/Linux; Solaris; MacOS; and etc., as well as various conventional support software and drivers typically associated with computers. The computers may be in a home, industrial or business environment with access to a network. In an exemplary embodiment, access is through the Internet through a commercially-available web-browser software package, including but not limited to Internet Explorer, Google Chrome, Firefox, Opera, and Safari.

The present invention may be described herein in terms of functional block components, functions, options, screen shots, user interactions, optional selections, various processing steps, features, user interfaces, and the like. Each of such described herein may be one or more modules in exemplary embodiments of the invention even if not expressly named herein as being a module. It should be appreciated that such functional blocks and etc. may be realized by any number of hardware and/or software components configured to perform the specified functions. For example, the present invention may employ various integrated circuit components, e.g., memory elements, processing elements, logic elements, scripts, look-up tables, and the like, which may carry out a variety of functions under the control of one or more microprocessors or other control devices. Similarly, the software elements of the present invention may be implemented with any programming or scripting language such as but not limited to Eiffel, Haskell, C, C++, Java, Python, COBOL, Ruby, assembler, Groovy, PERL, Ada, Visual Basic, SQL Stored Procedures, AJAX, Bean Shell, and extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like. Still further, the invention may detect or prevent security issues with a client-side scripting language, such as JavaScript, VBScript or the like.

Additionally, many of the functional units and/or modules herein are described as being "in communication" with other functional units, third party devices/systems and/or modules. Being "in communication" refers to any manner and/or way in which functional units and/or modules, such as, but not limited to, computers, networks, mobile devices, program blocks, chips, scripts, drivers, instruction sets, databases and other types of hardware and/or software, may be in communication with each other. Some non-limiting examples include communicating, sending, and/or receiving data and metadata via: a wired network, a wireless network, shared access databases, circuitry, phone lines, internet backbones, transponders, network cards, busses, satellite signals, electric signals, electrical and magnetic fields and/or pulses, and/or so forth.

As used herein, the term "network" includes any electronic communications means which incorporates both hardware and software components of such. Communication among the parties in accordance with the present invention may be accomplished through any suitable communication channels, such as, for example, a telephone network, an extranet, an intranet, Internet, point of interaction device (point of sale device, personal digital assistant, cellular phone, kiosk, etc.), online communications, off-line communications, wireless communications, transponder communications, local area network (LAN), wide area network (WAN), networked or linked devices and/or the like. Moreover, although the invention may be implemented with TCP/IP communications protocols, the invention may also be implemented using other protocols, including but not limited to IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997), the contents of which are hereby incorporated by reference.

Reference throughout this specification to an "embodiment," an "example" or similar language means that a particular feature, structure, characteristic, or combinations thereof described in connection with the embodiment is included in at least one embodiment of the present invention. Thus, appearances of the phrases an "embodiment," an "example," and similar language throughout this specification may, but do not necessarily, all refer to the same embodiment, to different embodiments, or to one or more of the figures. Additionally, reference to the wording "embodiment," "example" or the like, for two or more features, elements, etc. does not mean that the features are necessarily related, dissimilar, the same, etc.

Each statement of an embodiment, or example, is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The features, functions, and the like described herein are considered to be able to be combined in whole or in part one with another as the claims and/or art may direct, either directly or indirectly, implicitly or explicitly.

As used herein, "comprising," "including," "containing," "is," "are," "characterized by," and grammatical equivalents thereof are inclusive or open-ended terms that do not exclude additional unrecited elements or method steps. "Comprising" is to be interpreted as including the more restrictive terms "consisting of" and "consisting essentially of."

FIG. 1 is a network diagram of an assessment system over a computerized network, according to one embodiment of the invention. Such a system may be used by an employer to find quality candidates and/or by a prospective employee to find quality job opportunities within an organization or among a set of organizations.

There is shown as assessment system 10 in communication with a user interface module(s) 12 and an employer interface module(s) 14 over a computerized network 16. The assessment system 10 communicates with each of the user interface module(s) 12 and the employer interface module(s) 14 and automatically assesses prospective employees over the user interface module(s) 12 and reports/coordinates the processing of the same with employers over the employer interface module(s) 14. As a non-limiting example, such may be distributed over the internet, with the assessment system 10 being a server connected thereto and the user interface module(s) 12 and the employer interface module(s) 14 being personal computers and/or smartphone connected thereto through browsers/apps that may be resident on such devices and that may connect to application services and/or one or more websites served by the assessment system server. The illustrated employer interface module 14 may include one or more modules configured for use by a prospective employee to automatically assesses prospective employers/jobs over the user interface module(s) 12 and/or to report/coordinate the processing of the same over the employer interface module(s) 14.

The illustrated assessment system 10 is designed to assist employers/employees in finding the most qualified candidates/positions. Such may be used for other purposes and/or in other contexts, including but not limited to assessing suitability of volunteers with events and/or charitable causes; mentors with mentees; corporate or charity board members with board positions; vendors with clients; and the like and/or or vice-versa for any of the contexts described herein. Such a system may be deployable massively over a distributed network wherein those being assessed use their own devices or those accessible to them as appropriate and needed in order to interface with the system, and thus is highly scalable for large employers but still accessible for small employers. Such a system may be utilized for career planning for individuals and/or organizations; educational streaming/screening (e.g. by individuals, by post-secondary institutions); and/or may be utilized by associations and/or not-for-profits for purposes similar to those described herein. Such a system may be integrated and/or functionally coupled to one or more automated job boards, job syndicators, operational systems of temp/placement agencies, HR systems, and/or applicant tracking systems.

The assessment system 10 uses specific questions that are automatically selected by the system as being relevant to a specific employment position as a benchmark to filter for and find the most qualified candidates. The benchmark may be set by the employer seeking candidates through an employer interface module 14 in communication with the system over a computerized network 16.

The benchmark may be set automatically following an automated interview process and job analysis with the employer about the position and/or it may be set and/or modified by historical data regarding the position from the employer (or otherwise) such as but not limited to data entered from a study performed against past employees having that position and/or through an automated and/or continually/regularly/systematically updating interface with the HR records of the employer, thereby improving the benchmark correlation with success in the position over time. The system may automatically generate one or more custom reports, such as but not limited to an interview guide that may be customized to a job/position, may be customized to a particular applicant and/or may be customized to the specific interplay between a job/position and a specific applicant. As such, it may be that different interview guides are automatically generated for different applicants (and/or for the same applicant applying to two different jobs) and that such interview guides may differ in content, sequence of information, questions to ask, suggested follow-up questions to ask, and the like and combinations thereof.

The illustrated assessment system 10 is in communication with a user interface module 12 or a plurality of user interface modules over a computerized network 16 to complete the employment selection process. The employer may use the assessment system 10 to set standards, characteristics, traits, etc. which would lead, hypothetically, to success at the open employment position. The employment candidate uses the assessment system 10 through the user interface module 12 over a computerized network 16 to complete questionnaires for one or more employment positions.

According to one embodiment of the invention, there is an assessment system 10 designed to customize a benchmark and a test/questionnaire that employment candidates take for an employment position. The benchmark drives the automated customization of the test/questionnaire by the system. The benchmark may be determined as a result of a job analysis (e.g. a survey(s) completed by someone familiar with the job or completed by those holding the jobs, identifying behaviors and personality traits associated with successful holders of that job position). The assessment system 10 automatically analyzes the results of the survey(s) and thereby selects from a large set of behavioral characteristics to identify those most closely correlated with success and the ranges within them (not just the highest scores) that are most closely correlated with success.

The system 10 then automatically generates a test/questionnaire customized to the results of the survey analysis and automatically generates a grading/selecting/filtering process according to such results. Automatic generation of a test/questionnaire may be by script, function, and algorithm or otherwise wherein the system, based on particular criteria, chooses questions from a library of questions wherein such questions are tagged or otherwise associated with particular characteristics associated with characteristics sought for with regard to a particular position/job.

The system 10 automatically generates a "FitScore" between employment applicant's test results and the benchmark and then reports the same to the employer. Follow-up questions/processes may be automatically generated and communicated based on test results and analysis. The system 10 also matches candidates against multiple job listings that have benchmarks associated with them and their best matches are automatically reported to the employer.

The assessment system 10 is configured to provide an easier, shorter, better matching, highly predictive of success in the job, measures what matters, saves time, job-specific, scientifically validated, more reliable, customized, removes guesswork from the hiring process, more focused, statistically valid, easy to deploy on a massive scale, automatic, easy to deploy across a large number of candidates, not limited to large scale employers, brings rigor and discipline to the hiring process, user friendly but still rigorous, highly standardized across applicants for the same position, norm-referenced (e.g. scoring may be in reference to a normal distribution of a population), and legally defensible employment assessment system and method.

Advantageously, the system 10 may allow for the automated generation of useful benchmarks against which applicants may be measured. Further, the system may automatically generate assessment tools based on the benchmarks and customized thereto, thereby not including assessment questions/tools uncorrelated with successful applicants. The system 10 may be massively deployed over a network to be used by many employers of many different types and sizes who are filtering through any number of applicants and allow such employers to usefully filter down to manageable numbers of candidates from any candidate population size. The system 10 may automatically provide additional features and benefits for the applicants and/or the employers during and after the assessment process that may additionally support the efforts of such parties, including but not limited to redirecting applicants to different positions/employers for which they may be better suited and/or generating useful follow-up assessment tools/ideas for employers to use in further filtering among applicants.

Figure 2:
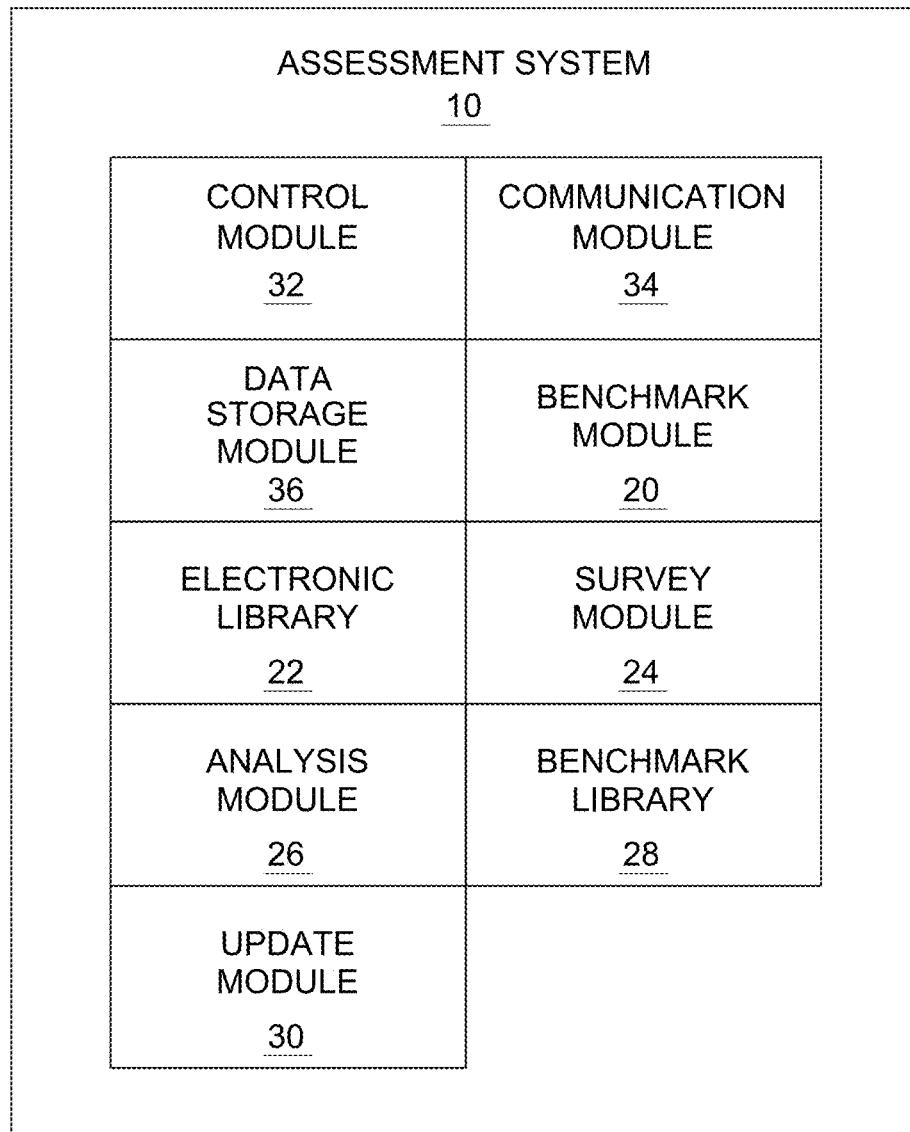
FIG. 2 is a module diagram of an assessment system, according to one embodiment of the invention.

FIG. 2 is a module diagram of an assessment system, according to one embodiment of the invention. There is shown an assessment system 10 including a control module 32, a communication module 34, a data storage module 36, an analysis module 26, a benchmark module 20, a survey module 24, an electronic library of questions 22, a benchmark library of electronic records 28, and a update module 30 each in communication with each other as appropriate to perform their various functions. Other modules not shown may be present and/or may be incorporated within the illustrated modules, including but not limited to an administration module, a scoring module, and a reporting module. The illustrated modules operate together to provide automated benchmark generation and analysis, automated customization of assessment tools based on such benchmarks, deployment of the same to a multiplicity of candidates, automated analysis of such assessments as measured against the benchmarks, and ancillary features and functions as described herein.

The illustrated assessment system 10 automatically assess an individual and an associated job using a computing device. The system 10 includes a benchmark module 20 that stores a benchmark associated with a job. The benchmark may include both minimum threshold scores and maximum threshold scores associated with one or more particular characteristics. As a non-limiting example, a benchmark for a supporting position may include a maximum threshold score for an aggressiveness-type characteristic/trait that may be less than a maximum allowable score, while a benchmark for a job requiring meticulous attention to detail may include a maximum threshold score for an creativity-type characteristic/trait that may be less than a maximum allowable score. The benchmark may be as simple as record of characteristics, each with minimum, maximum, and/or target scores/values. Benchmarks may be more complicated wherein cross-characteristic patterns/dependencies may be desired (e.g. high in a particular characteristic is desired unless another particular characteristic is also high) or wherein such patterns/dependencies may have been observed from successful employees in such jobs.

The system 10 includes an electronic library of questions 22 associated with an array of characteristics. The questions may be tagged or otherwise associated with particular traits/characteristics such that the system can draw from those questions as needed to automatically generate tests/etc. using such questions. The questions may also include other tags/markers for use by the system to generate better tests, such as but not limited to question groupings (e.g. the system pulls all questions from a particular grouping (e.g. questions grouped by education level to understand the question) or the system is restricted from pulling a questions from the same grouping twice (e.g. questions grouped in order to maximize the system's ability to detect when the test taker is defrauding the test)). The system may utilize such tags in automated generation of tests according to benchmark(s). The electronic library may also include tags associated with intended use or expected use of the questions, especially in the case where a single system services multiple user group types. Such may include but it not limited to marking a question as suitable for employment tests, while other questions are suitable for non-employment situations.

The illustrated system 10 includes a survey module 24 functionally coupled to the electronic library 22 and the benchmark module 20 to automatically perform an assessment by automatically selecting questions from the electronic library 22 based on the benchmark and applying such questions to an individual using a user interface module. The survey module 24 may also automatically generate a benchmark associated with a job by applying an assessment to a pool of individuals that perform that job and recording the results in association with data regarding those individuals performance at that job.

The illustrated assessment system 10 includes an analysis module 26 functionally coupled to the survey module 24 that analyzes application of the assessment process to the individual. The analysis module 26 automatically generates a report that details the analysis of the individual with respect to the job. The assessment system 10 includes a benchmark library 28 having electronic records of an array of benchmarks against which the analysis module 26 compares an individual. Accordingly, a prospective employee may take a test that includes questions associated with all characteristics relevant to a set of benchmarks and then the results of the test may be analyzed by the assessment system and a report may be generated that, instead of comparing a plurality of candidates with a single job, compares a single candidate with a plurality of jobs. The assessment system 10 includes an update module 30 modifies the benchmark based on real-time employment data from an employer.

The illustrated assessment system 10 includes a control module 32 that provides operational instructions and commands to the modules and components of the system 10. The control module 32 is in communication with the modules and components of the system 10 (and/or other modules described herein) and provides managerial instructions and commands thereto. The source of such instructions/commands may be from one or more other modules described herein and/or through interactions between one or more other modules described herein. The control module 32 sets parameters and settings for each module and component of the system 10. Non-limiting examples of a control module may be a control module described in U.S. Pat. No. 5,430,836, issued to Wolf et al.; or a control module described in U.S. Pat. No. 6,243,635, issued to Swan et al. which are incorporated for their supporting teachings herein. A control module may include but is not limited to a processor, a state machine, a script, a decision tree, and the like.

The illustrated assessment system 20 includes a communication module 34, such as a network card, system bus, or wireless communication module, and communicates with a computerized network. The communication module 34 provides communication capabilities, such as wireless communication, to the modules and components of the system 10 and the components and other modules described herein. The communication module 34 provides communication between a wireless device, such as a mobile phone, and a computerized network and/or to facilitate communication between a mobile device and other modules described herein. The communication module 34 may have a component thereof that is resident on a user's mobile device or on a user's desktop computer. Non-limiting examples of a communication module may be but not limited to: a communication module described in U.S. Pat. No. 5,307,463, issued to Hyatt et al.; or a communication module described in U.S. Pat. No. 6,133,886, issued to Fariello et al., which are incorporated for their supported herein.

The illustrated system 10 includes a data storage module 36 in communication with the modules and components of the system 10. The data storage module 36 collects and store data for each of the modules of the system 10. The data storage module 36 is in communication with the various modules and components of the system 10 over a computerized network and stores data transferred there through. The data storage module 36 stores data transferred through each of the modules of the system 10, thereby updating the system with up to date data and real time employment data. The data storage module 36 securely stores user data along with data transferred through the system 10. Data storage modules 36 may be databases and/or data files and the memory storage device may be, but is not limited to, hard drives, flash memory, optical discs, RAM, ROM, and/or tapes. A non-limiting example of a data storage module may be a Filemaker Pro 11, manufactured by Filemaker Inc., 5261 Patrick Henry Dr., Santa Clara, Calif., 95054. Non-limiting examples of a data storage module may include: a HP Storage Works P2000 G3 Modular Smart Array System, manufactured by Hewlett-Packard Company, 3000 Hanover Street, Palo Alto, Calif., 94304, USA; or a Sony Pocket Bit USB Flash Drive, manufactured by Sony Corporation of America, 550 Madison Avenue, New York, N.Y., 10022.

The illustrated assessment system 10 includes an analysis module 26 that includes executable information regarding employment positions, characteristics, qualifications, traits, etc. and user data. The analysis module 26 is in communication with the modules and components of the system 10 as appropriate to perform its function(s). The analysis module 26 analyzes collections of employment data according to the executable information regarding employment positions and employment candidates, such as metadata. The analysis module 26 analyzes stored metadata from the data storage module 36 thereby generating a rating or summary tailored for a specific employment position. The analysis module 26 is configured to analyze user employment data from a set of questions customized by the employer to determine which selection of employment options best matches the candidate and the position, based on the user's answers to the questions from the system 10. The analysis module 26 may process assessment data from candidates for scoring and/or for preparation for scoring. Such may include comparing responses against target responses and/or target response ranges, recording variance data from the same, notating large variances, validating response sets, error checking response sets, comparing against secondary, additional, ancillary, and/or even unrelated benchmarks and the like and combinations thereof. Such may be performed automatically using scripts, functions, matching engines, data conditioning modules, data processing modules and the like and combinations thereof. Non-limiting examples of analysis module may be a data analysis system as described in U.S. Patent Publication No.: 2012/0290576; or an analysis system as described in U.S. Patent Publication No.: 2011/0208519, which are incorporated for their supporting teachings herein. Non-limiting examples of a knowledge base module may be as described in U.S. Pat. No. 6,064,971 by Hartnett and U.S. Pat. No. 5,257,185 by Farley, which are incorporated for their supporting teachings herein.

The illustrated assessment system 10 includes a survey module 24 (and/or a study module) that is in communication with the modules and components of the system 10 and that gathers/manages/uses performance and/or behavioral data to help automatically generate benchmarks. The survey module 24 includes a study module which may gather/manage/use real data from existing employees to help automatically generate benchmarks. The study module may perform and/or automatically perform a criterion-related study to determine the predictive validity of an assessment to job performance. The survey module 24 is in communication with an employer interface module over a computerized network, wherein the employer uses the employer interface module to set standards, characteristics, traits, qualities, that would identify a qualified and successful candidate for a particular employment position. The survey module 24 includes an application and/or website that may be served over a network and may include questions associated with building a benchmark associated with a position. The survey module 24 includes account management and access modules that allow employers to store such information in association with their account and/or to manage a plurality of benchmarks in the form of different job positions that they seek to fill. The survey module 24 may include a pattern library module, wherein sets of data, job descriptions, job postings, benchmarks, etc. that may be unique to each employer/etc. may be stored, managed, and/or be kept separate or otherwise secure. There may also be a common pattern library account that may store sets of data, job descriptions, job postings, benchmarks, etc. that may be accessible by one or more user accounts, including but not limited to employer/etc. accounts. Accordingly, an employer could use common data to facilitate in the generation of private and unique job descriptions and benchmarks associated therewith and then run data from applicants applying for one particular job in the set against a different job within the set (e.g. to explore fits for career/succession planning). Such modules may also be in communication with one or more data management modules of the employer that may feed information to the system regarding information relevant to building and/or modifying benchmarks, such as but not limited to actual employment data (e.g. duration of employment, results of performance evaluations). Non-limiting examples of a survey/concurrent study module may be as described in U.S. Patent Publication No.: 2011/0000095 or a survey system as described in U.S. Pat. No. 8,635,099; which are both incorporated for their supporting teachings herein.

The illustrated assessment system 10 includes a benchmark module 20 that is in communication with the modules and components of the system 10. The benchmark module 20 is in communication with the survey module 24, wherein the benchmark module 20 uses the data from the survey module 24 to automatically generate a benchmark for a particular employment position. The benchmark may be used over and over again for a particular employment position for a particular company or employer. The benchmark would be the standard as to how well the candidate would be likely to perform at the particular employment position. As a non-limiting example, such may be accomplished by scoring/weighting results from real data and/or survey(s) regarding the position from one or more sources (e.g. libraries, survey results, study results, reports, etc.) to determine which characteristics, traits, skills, abilities, interests, references, desires, past work history, ambitions, handwriting, demographics, psychological assessments, tendencies, types, etc. are most closely associated with success in a position and to determine the ranges of responses within such that are also most closely associated with success. Generally it is advisable for such a system to include sufficient questions, questions types, variations on the same question, and the like in order to validate the responses and cross-check the validity of the resulting analysis so that any benchmarks derived therefrom are more likely to be useful during the assessment process. Non-limiting examples of a benchmark module may be a system as described in U.S. Pat. No. 6,873,934; or a benchmark module as described in U.S. Patent Publication No.: 2014/0207415; which are both incorporated for their supporting teachings herein.

The illustrated assessment system 10 includes an electronic library of questions 22 associated with an array of characteristics. The electronic library 22 is in communication with the modules and components of the system 10, wherein the electronic library 22 is in communication with the data storage module 36 to store a plurality of questions for an employer to select from, when looking to hire an new employee or when looking to promote or move current employees within the company. Non-limiting examples of an electronic library of questions may be an electronic library as described in U.S. Pat. No. 8,661,185, issued to Thorp et al.; or a library system as described in U.S. Pat. No. 7,287,214, issued to Jenkins et al., which are both incorporated for their supporting teachings herein.

The illustrated assessment system 10 includes a benchmark library 28 including electronic records of an array of benchmarks against which the analysis module 26 may compare an individual to find an employment position that best suits the individual. The benchmark library 28 is in communication with the modules and components of the system 10. The benchmark library 28 is in communication with the data storage module 36 and the benchmark module 20, wherein the benchmark library stores benchmarks and associated data therewith through the data storage module 36 and receives a plurality of electronic records of an array of benchmarks from the benchmark module 20. Non-limiting examples of a benchmark library may be an electronic library as described in U.S. Pat. No. 8,661,185, issued to Thorp et al.; or a library system as described in U.S. Pat. No. 7,287,214, issued to Jenkins et al., which are both incorporated for their supporting teachings herein.

The illustrated assessment system 10 includes an update module 30 that modifies the benchmark based on real-time employment data from an employer. The update module 30 is in communication with the modules and components of the system 10. The update module is in communication with the benchmark module 20 and an employer interface module, wherein the employer may set new benchmarks and the update module 30 automatically updates the employers array of benchmarks from the benchmark module 20 in real-time. The update module 30 is in communication with the data storage module to store newly modified array of benchmarks. Non-limiting examples of an update module may be a method and module as described in U.S. Patent Publication No.: 2014/0306973, by Yang et al.; or an update module as described in U.S. Patent Publication No.: 2010/0161219, by Lo; which are both incorporated for their supporting teachings herein.

There may be an assessment generation module (not illustrated) that may automatically generate one or more assessment tools (e.g. questionnaires, surveys, skill tests) based on characteristics, traits, skills, abilities, interests, references, desires, past work history, ambitions, handwriting, demographics, psychological assessments, etc. identified within the benchmark (and ranges thereof) as being relevant. The assessment generation module may automatically generate an assessment based on information from one or more sets of benchmarks. The assessment generation module may automatically select from a library of assessment tools, questions, exams, that may be associated with a library/table of traits, characteristics, skills, abilities, tendencies, etc. whereby the tools/etc. may be indexed and thus automatically selected by the assessment generation module. The assessment generation module may include scripts, boundary conditions, formatting requirements and the like that may be define limits to what may be selected and how it may be presented. Such may be associated with one or more user accounts such that different employers may have different assessments with different levels of rigor, duration, etc. An assessment generation module may automatically include "noise" in the form of tools/etc. that are not closely associated with success in order to reduce "gaming" the system or espionage acts. There may also be adaptive questions (e.g. questions that rule out portions of a range with respect to a trait but do not determine an exact score on that trait) and/or assessment tools that include randomized question sets. As a non-limiting example, such a module may automatically select questions from a library of questions that are indexed according to desired traits. Non-limiting examples of an assessment generation module include modules described in US Patent Application Nos. 20080208665 and 20050276396, which are both incorporated by reference herein for their supporting teachings.

The assessment system may include a scale module, not shown, which is in communication with the modules and components of the system. The scale module is in communication with the analysis module and the benchmark module to generate a scale for a particular employment position with regard to one or more traits, characteristics, etc. of the same. The scale module may set limitations, parameters, regulations for a particular employment position. Such a scale may be within upper and lower bounds of a rating of a trait/etc. instead of merely being represented as above or below a particular threshold. The scale module allows a user to identify where they are on the scale, and/or may identify where the candidate needs to improve to compete with other employment candidates in a particular employment field. Non-limiting examples of a scale module may be a rating system as described in U.S. Patent Publication No.: 2012/0220364 or a system as described in U.S. Patent Publication No.: 2014/0200879; which are both incorporated for their supporting teachings herein.

The assessment system may include a scoring module, not shown, that is in communication with the modules and components of the system. The scoring module is in communication with the scale module in order to generate an overall score for a employment candidate for a particular employment position. The scoring module is configured to set criteria, scoring parameters, ratings, etc. for a particular employment position. The scoring module then rates the answers from an employment candidate for a particular employment position and gives them a score or rating. The scoring module may be static in that it scores a whole test, including portions not relevant to a particular benchmark. The scoring module adaptively scores such that traits/etc. that are weighted as being more important receive a higher degree of certainty in the scoring and others are scored less rigorously. Non-limiting examples of a scoring module may be a scoring module as described in U.S. Patent Publication No.: 2014/0236927; or a scoring system as described in U.S. Pat. No. 8,157,566; which are both incorporated for their supporting teachings herein.

The assessment system 10 may include a report module, not shown, in communication with the data storage module. The report module is configured to automatically generate one or more reports, including but not limited to employment analysis information from the scoring module. The report module is configured to set parameters, criteria, characteristics, settings, preferences, listings, categories, groupings, etc. for a report, for employment candidates to review how they rated with the other candidates. Non-limiting examples of reports and the subject matter thereof are provided in Appendix A. Non-limiting examples of a report module may be a system as described in U.S. Pat. No. 7,711,581; or a report generation module as described in U.S. Patent Publication No.: 2012/0284188, which are incorporated for their supporting teachings herein.

According to one embodiment of the invention, there is an assessment system that automatically customizes the assessment based on an automatically generated benchmark that is determined by analyzing data to determine what characteristics are correlated to success on the job ("fit with job," e.g. how long will they stay and how well will they do). There is a survey module (e.g. surveying manager to see what he thinks is good) or a concurrent study module (e.g. using real data from existing employees), a benchmark generation module (automatically generates the benchmark, which is a list of behavioral characteristics and their associated ranges where success is expected to be correlated), assessment generation module (automatically generates an assessment based on the benchmark), scoring module (automatically generates implements a filter/scoring system for the customized assessment based on the benchmark), and a reporting module (automatically reports filtered results to the employer). There may be a position library module (stores information about positions including associated benchmarks and other data like survey results). The library may categorize benchmarks by position, by location, by division, by leadership, etc.

According to one embodiment of the invention, there is an assessment system which is essentially a bank of hundreds of psychometric behavioral and cognitive items intended to measure an individual's characteristics for the purpose of determining the best fit for employment in a specific position. Assessments administered for particular jobs are customized based upon extensive locally validated job analysis procedures and analysis of traits of existing employees who have been successful in the position. The items used are grouped into 25 personality constructs, or scales, and 1 cognitive reasoning scale. The specific scales measured are selected based on the results of the job analyses. This unique scale selection process improves the efficiency and relevance of each assessment and reduces administration time when compared to assessment systems which subject candidates to examination of all scales regardless of the correlation of the scales to the job in question.

According to one embodiment of the invention, the assessment system includes a cognitive reasoning section which also may or may not be administered depending upon the findings of the job analysis procedures. The items used to measure cognitive reasoning are based upon extensive research into the types of cognitive tasks individuals should be able to successfully complete at various levels of ability. While cognitive ability has been shown to be a good predictor of success in a job, there are certain positions for which ability level may be gleaned from other sources such as education level or other extant test scores. The cognitive reasoning portion of the assessment is provided as an option, but may not be administered to all job candidates, especially if those candidates have other proof of cognitive ability level.

Figure 3A:
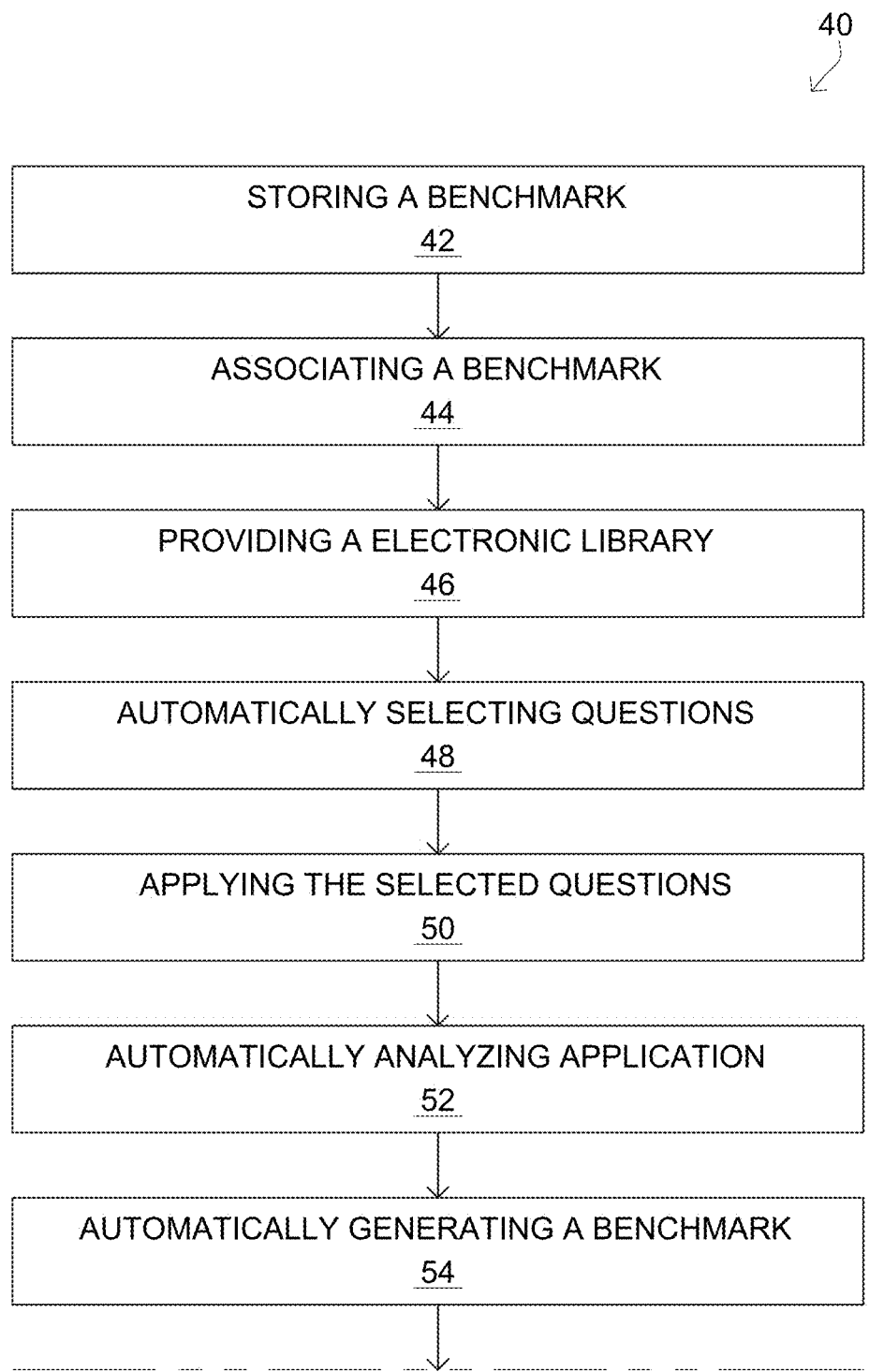
FIG. 3 is a flowchart of a method of automatically assessing an individual and an associated job using a computing device, according to one embodiment of the invention.
Figure 3B:
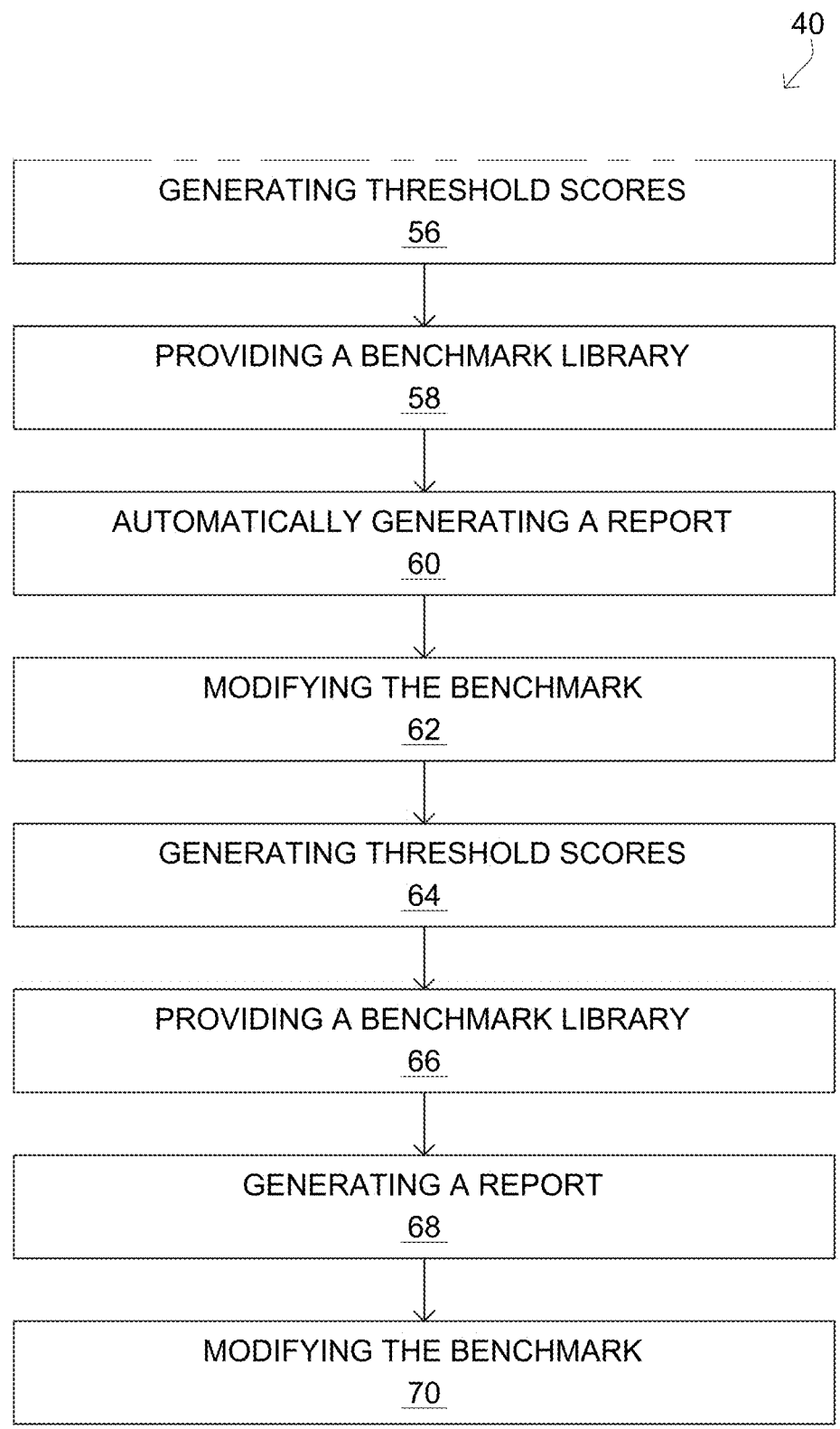

FIG. 3 is a flowchart of a method of automatically assessing an individual and an associated job using a computing device, according to one embodiment of the invention. There is shown a method of automatically assessing an individual and an associated job using a computing device 40 over a computerized network.

The illustrated method 40 includes the step of storing a benchmark associated with a job 42. As a non-limiting example, such may be accomplished by saving a record in a data storage device, such as but not limited to a hard drive of a server. The benchmark may be in a data format associated with a particular database storage system and may include a plurality of characteristics and/or associated scores, thresholds, ranges, patterns, dependencies and the like and combinations thereof, and/or may include job information such as but not limited to job title, employer, position quantity, deadline to fill position(s), job requirements, job location, and the like and combinations thereof.

The illustrated method 40 includes the step of associating a benchmark with a plurality of characteristics 44. As a non-limiting example, such may be accomplished by appending a benchmark with characteristic information such as but not limited to characteristics and/or associated scores, thresholds, ranges, patterns, dependencies and the like and combinations thereof.

The illustrated method 40 includes the step of providing an electronic library of questions 46 wherein the questions are associated with an array of characteristics including the plurality of characteristics. As a non-limiting example, such may be accomplished by connecting a preexisting library of questions to a system over a network and/or by generating an electronic library having questions associated with characteristics that are relevant to a particular job.

The illustrated method 40 includes the step of automatically selecting questions from the electronic library of questions based on the benchmark and its associated plurality of characteristics 48. Such may include automatically not selecting questions that are not associated with a characteristic shown to be relevant to a particular job. As a non-limiting example, such may be accomplished by filtering question records by characteristic with zero or more other tags (e.g. group tags) and randomly selecting questions that remain when the filter is applied.

The illustrated method 40 includes the step of applying the automatically selected questions to an individual 50. As a non-limiting example, such may be accomplished by operation of a survey module, printing out a test and delivering it to the individual, surveying a third party with regards to the individual, or the like or combinations thereof. The application may be an internet-based assessment which may be within the automated system, and/or may be customized for each job within a given organization.

Employers may establish a system account, create a job in their library, and/or answer a survey for that job. They may add other positions and/or complete additional surveys, as desired. The system may generate a one or more URL(s) for each position that may be unique, which may be for use in advertising the position to candidates. When a job seeker clicks on the URL, they may be brought into the system. They may have the option of attaching a résumé and answering online interview questions as part of their submission; once that part of the process is complete, they may be invited to complete the custom assessment for the position to which they are applying.

Generally, there is no time limit for the assessment, however most people should be able to complete it within 60 minutes. Personality items may offer brief descriptions of behavioral tendencies and/or attributes which may be responded to on a 5-point Likert-type scale asking respondents to identify the frequency at which they believe they display the behavior or attribute. Cognitive reasoning items may be formatted with multiple-choice responses.

The illustrated method 40 includes the step of automatically analyzing application of the assessment process to the individual using a computing device 52. As a non-limiting example, such may be accomplished by operation of an assessment module or otherwise processing answered test questions associated with the individual in comparison with one or more benchmarks. Such processing may track compliance and/or non-compliance with a benchmark, may report on patterns, may calculate one or more properties based on the answered questions (e.g. inferring a likelihood of success for the candidate, suggesting specific steps to take to help the candidate be more successful in their job).

Each domain or scale in the assessment may scored separately (e.g. on a percentile scale which has been normed on the working population of North America). Percentile scores may then be automatically compared to score ranges identified in the benchmarking process. A gap may be reported if candidate's scores fall outside that range. The larger the gap, the further away from the desired score range the candidate is on a particular scale. A proprietary algorithm may be used to calculate a Fit Score which provides an overall look at how closely a candidate matches the overall benchmark.

The illustrated method 40 includes the step of automatically generating a benchmark associated with a job by applying an assessment to a pool of individuals that perform that job 54. Such may include eliminating one or more characteristics from a set of characteristics as being relevant to job performance. As a non-limiting example, such may be accomplished by operation of a survey module such that the pool of individuals takes a broad spectrum test including questions associated with a multiplicity of characteristics such that patterns associated with the same may later be analyzed/observed. Operation of a survey module may include but is not limited to: pushing a test to a plurality of remote computing devices (e.g. smart phones, tablet, desktop computers), printing a test and providing a machine readable user interface on which answers may be placed (e.g. machine readable paper sheets, desktop computer, smartphone), and the like and combinations thereof.

A key to the effectiveness of any assessment system used for selection and/or placement is local validation. That is, the assessment and resulting information should be relevant to the specific job for which the system is being used. To accomplish this, the system may use a comprehensive survey which identifies relevant scales for benchmarking but also identifies the scales which should be included in an assessment for a particular job, along with concurrent study capabilities to identify the behavioral and cognitive factors which most greatly influence the potential success of a candidate in a specific job. While other assessment systems require testees to respond to all questions in all scales regardless of their relevance to the job in question, the system may only require candidates to respond to items in those scales which have proven to be associated with success on the job based on the results of the position analysis functions.

Along with determining which scales need to be assessed for a specific job, the survey may also automatically establish a range of scores within those scales which have shown to be correlated with success on the job. This may be accomplished by having a person familiar with the demands of the job complete the survey, which contains an algorithm for determining score ranges, or by assessing incumbents in the job and determining the range of scores most often reported for those who are or have been successful in the position. The score ranges for the scales assessed become the benchmark against which all future candidates will be compared to help determine their potential for successful performance in the job.

The illustrated method 40 includes the step of generating both minimum threshold scores and maximum threshold scores associated with the plurality of characteristics while associating the benchmark with the plurality of characteristics 56. As a non-limiting example, such may be accomplished by analyzing test results for a pool of job holders for a particular job and observing (automatically or otherwise) characteristic patterns among those who are the most/least successful at their jobs or who have been so identified to the system, such as but not limited to by annotating a record regarding that employee in the system, and/or by surveying an employer regarding desired characteristics for a particular job.

The illustrated method 40 includes the step of providing a benchmark library including electronic records of an array of benchmarks against which the analysis module may compare an individual and automatically applying automatically selected questions associated with each of the array of benchmarks to the individual 58. As a non-limiting example, such may be accomplished by functionally coupling a database storing such to the system or generating such a database within the system.

The illustrated method of automatically assessing an individual and an associated job using a computing device 40 includes the step of automatically generating a report that details the analysis of the individual with respect to the job 60. As a non-limiting example, such may be accomplished by operating of a script that automatically reports specific information based on how well or how poorly test results match up with a benchmark on a characteristic-by-characteristic basis and/or based on specific patterns of characteristics.

The illustrated method 40 includes the step of modifying the benchmark based on real-time employment data from an employer, including real-time data regarding hiring and firing of employees within an employee pool associated with a particular benchmark 62. As a non-limiting example, such may be accomplished by functionally coupling the system to a system for onboarding new hires and/or for handling exit processing of employees, such that data regarding performance, relevant characteristics, and the like may be appended to a job record and/or its associated benchmark(s) in real-time.

The illustrated method 40 includes the step of automatically generating a benchmark associated with a job by applying an assessment to a pool of individuals that perform that job. As a non-limiting example, such may be accomplished by operation of a survey module and/or an assessment module in as described herein.

The illustrated method of automatically assessing an individual and an associated job using a computing device 40 includes the step of generating both minimum threshold scores and maximum threshold scores associated with the plurality of characteristics while associating the benchmark with the plurality of characteristics 64. As a non-limiting example, such may be accomplished by operation of a survey module and/or an assessment module as described herein.

The illustrated method 40 includes the step of providing a benchmark library including electronic records of an array of benchmarks against which the analysis module may compare an individual and automatically applying automatically selected questions associated with each of the array of benchmarks to the individual 66. As a non-limiting example, such may be accomplished by operation of a survey module and/or an assessment module as described herein.

Figure 4:
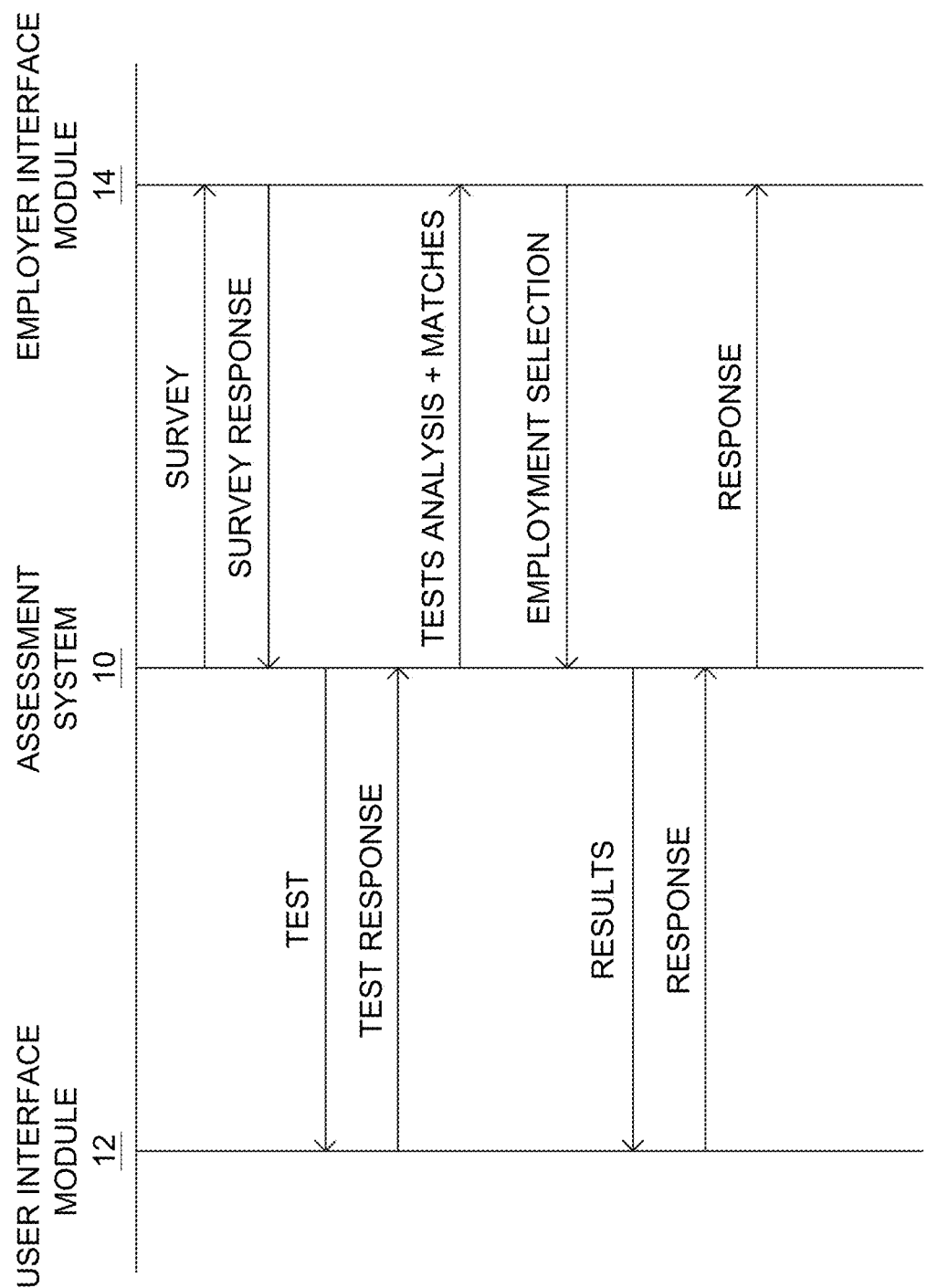
FIG. 4 is a sequence diagram of a method of automatically assessing an individual and an associated job using a computing device, according to one embodiment of the invention.

FIG. 4 is a sequence diagram of a method of automatically assessing an individual and an associated job using a computing device, according to one embodiment of the invention. There is shown a user interface module 12, an assessment system 10, and an employer interface module 14 in communication with each other over a computerized network. Actions and/or communications between the modules/systems are illustrated in time order (time progressing top to bottom) as labeled arrows between stems under the modules.

The illustrated user interface module 12 is in communication with an assessment system 10 and the assessment system 10 is in communication with an employer interface module 14. The assessment system 10 sends a survey to the employer interface module 14, wherein the employer interface module 14 fills out characteristics and qualities that would lead to a successful employee at their company. The employer interface module 14 sends back the survey response to the assessment system 10, wherein the assessment system 10 evaluates the survey and determines the criteria needed to find a successful employee that matches the employer's needs.

The illustrated assessment system 10 sends a test to a plurality of user interface modules 12, wherein the user interface module 12 completes the test and sends back a test response to the assessment system 10. The assessment system 10 analyzes the test responses from the user interface modules 12 and matches all candidates against a benchmark for the intended position, and thereby identifies those with the highest probability of success for the intended position.

The assessment system 10 sends test analysis and employee matches to the employer interface module 14 for the employer to decide on which candidate to select for the employment position. The employer interface module 14 sends employment selection to the assessment system 10, wherein the assessment system 10 sends employment results to the user interface module 12. The user interface module 12 reviews the results from the assessment system 10 and responds with an employment agreement. The assessment system 10 notifies the employer interface module 14 that the user interface module 12 has accepted an employment position with them.

Looking to FIGS. 5 and 6, an individual's score may be first calculated by totalling the 1 to 5 ratings across all questions for each scale/trait. The total raw scale score is then compared to a percentile lookup table derived from the pilot-testing of hundreds of subjects who responded to all items for all scales. The lookup table generates a percentile rank for each scale raw score and uses that percentile rank (1-100) as the score for all calculations and derivations throughout the process.

The traits or scales which are most relevant to a particular job are determined through the benchmarking process. The system uses results from the Position Analysis Survey and/or current employee results from the full assessment instrument in a criterion-related validity process which identifies those scales or traits which best differentiate highly rated employees from those with lower performance metrics. Once those traits are identified, subsequent assessment instruments for that particular position contain only those scales which showed to be the most effective at identifying those individuals who have been successful in the job. The system is pre-set to select only those scales with the tightest score groupings of top and bottom performers. For example, looking specifically at FIG. 5:

Example 1 shows the score distribution of 20 current employees (10 high performers and 10 low performers) on a particular scale or trait, say Extraversion. By virtue of the fact that all the top performers scored in the lower end of the scale and all the low performers scored in the high end, the system would identify this as a relevant scale and set the resulting benchmark at score-range 1-3. This scale would then be selected for inclusion in subsequent assessments for applicants for the job in question.

Example 2 shows the same 20 current employees on a different scale (say Ambition) and the distribution of their scores. As can be seen by the wide spread and similar distribution of scores, this scale is not good at differentiating between the two groups (high and low performers). The system looks at this distribution by calculating means and variance scores to determine whether or not a statistically significant difference exists. Seeing no significant difference between score distributions of the two groups, the system would de-select this scale for inclusion in subsequent assessments. As well, the Ambition scale, in this example, would not be used in the benchmark for the position.

A key difference between this process and other selection assessments is the customization of the assessment instrument itself for each different position. Most other selection tools have some form of benchmarking process, but none tests only the scales relevant to the benchmark, opting to test ALL scales and only compare relevant scale scores to a benchmark while ignoring the others. This is what makes this assessment system dynamic as opposed to static as all other assessments in the field.

The Fit-score is calculated by totalling and averaging the point differentials for an individual's scale score and the relative distance that score is from the benchmark range. The direction (above or below) of the distance from the score range in the benchmark is not a contributing factor to the score itself, but does inform the system regarding statements and descriptions to be offered in user reports. For example, looking specifically at FIG. 6:

Example 1 shows a benchmark of 3-5 with the individual score of 8. This individual's fit score would calculate to approximately 70 (possible 100) based upon the distance from the highlighted range and the stepwise algorithm in place to weight distances based on the relative size of the benchmark range.

Example 2 shows a benchmark of 7-10 with the individual score of 2. This individual's fit score would calculate to approximately 30 since it is further from the benchmark and given the fact there are more opportunities to be in the benchmark scale since it is wider (more inclusive) by design.

In one non-limiting embodiment, there is a system that includes a bank of hundreds of psychometric behavioral and cognitive items intended to measure an individual's characteristics for the general purpose of determining the best fit for employment in a specific position. Assessments administered for particular jobs may be customized based upon extensive locally validated job analysis procedures and/or analysis of traits of existing employees who have been successful in the position. The items used may be grouped into personality constructs, or scales, and/or cognitive reasoning scale(s). The specific scales measured may be selected based on the results of the job analyses. This unique scale selection process improves the efficiency and relevance of each assessment and/or reduces administration time when compared to assessment systems which subject candidates to examination of all scales regardless of the correlation of the scales to the job in question.

There may also be a cognitive reasoning section which also may or may not be administered depending upon the findings of the job analysis procedures. The items used to measure cognitive reasoning are generally based upon extensive research into the types of cognitive tasks individuals should be able to successfully complete at various levels of ability. While cognitive ability has been shown to be a good predictor of success in a job, there are certain positions for which ability level may be gleaned from other sources such as education level or other extant test scores. The cognitive reasoning portion of the assessment is provided as an option, but may not be administered to all job candidates, especially if those candidates have other proof of cognitive ability level.

Scales listed below are a non-limiting exemplary set of scales. Such were selected based upon a meta-analysis of the literature related to individual behavioral traits most commonly investigated by employers during the hiring process. Each scale is assessed as it relates to the particular job for which an individual is applying. Therefore, depending on the benchmark created to describe a successful employee in that job, desirable score may fall anywhere within the range from low to high Simply put, high scores on all scales is not always the desired outcome. It is important to note that only those scales deemed relevant to the job, based on the job benchmark, will be assessed.

The following is a non-limiting exemplary list of scales: Conscientiousness; Openness; Acumen; Assurance; Resolve; Reliability; Creativity; Extraversion; Intensity; Control; Decisiveness; Autonomy; Ambition; Adventurousness; Agreeableness; Gregariousness; Cooperativeness; Tact; Influence; Compassion; Teamwork; Stability; Compliance; Optimism; Happiness; Social Desirability; Problem Solving; and/or Cognitive Reasoning.

In one non-limiting embodiment, a system may include a scale and/or an automated process for helping determine the viability of assessment results as a valid means of informing the applicant selection and/or placement function. A response bias scale may measure the forthrightness of the respondent and the statistical consistency of responses on the assessment. When respondents intentionally try to misrepresent themselves, have difficulty reading, or simply select item responses randomly the resulting inconsistency of responses can automatically lead to a warning in the report stating that the assessment results may not be representative of the individual and should be used with caution. The response bias scale does not determine whether or not a person is lying, but rather refers to the validity of responses and the confidence which may be placed on results based upon the individual's response patterns.

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

For example, although the description herein often discusses modules and the like with respect to an employer seeking candidates, the same modules may be utilized by a prospective employee seeking a good fit in a job.

Additionally, although the figures illustrate a specific order to particular steps, it is understood that the invention is not limited to the illustrated order of steps herein.

It is also envisioned that a single system may include a plurality of user interfaces which may appear to service one particular group of users, but the entire system may support multiple such groups. As a non-limiting example, the same system may include functionality and modules therewith to support prospective employees in search for good fit jobs, while simultaneously facilitating employers in search for good job candidates and simultaneously assisting students in search of mentors/tutors for particular subjects, and assisting funding sources in finding suitable projects to fund (e.g. research grants).

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims. Further, it is contemplated that an embodiment may be limited to consist of or to consist essentially of one or more of the features, functions, structures, methods described herein.

What is claimed is:

1. A method of automatically assessing an individual and an associated job using a computing device, comprising the steps of:

a) automatically generating a locally validated benchmark within a benchmark module and associated with an employment position by:

a1) applying a broad spectrum assessment via a survey module accessible over a user interface module, the survey module being functionally coupled to an electronic library, to a pool of individuals that have been successful in performing that employment position, wherein the broad spectrum assessment includes a multiplicity of specific questions from the electronic library related to a multiplicity of psychometric behavioral characteristics;

a2) automatically identifying, by operation of an assessment module in communication with the survey module and with the benchmark module, minimum threshold scores and maximum threshold scores of psychometric behavioral characteristics that are most closely correlated with success of employees having that employment position and eliminating psychometric behavioral characteristics that are not closely correlated with success and storing, in a memory storage device of the benchmark module, the identified minimum threshold scores and maximum threshold scores of the non-eliminated psychometric behavioral characteristics as a set of identified ranges of those specific psychometric behavioral characteristics, thereby generating the benchmark;

b) associating the automatically generated locally validated benchmark with the employment position by operation of the benchmark module;

c) associating the automatically generated locally validated benchmark with a plurality of characteristics that include the behavioral characteristics determined to be most closely correlated with success by operation of the benchmark module;

d) providing, from the electronic library, tagged questions wherein the tagged questions are tagged with an array of psychometric behavioral characteristics including the plurality of characteristics;

e) automatically generating a test by operation of the benchmark module in functional communication with the electronic library that selects tagged questions from the electronic library of questions wherein the selected tagged questions include tagged questions that are tagged or otherwise associated with the plurality of characteristics; and f) applying the automatically selected tagged questions to an individual via a survey module over a riser interface module in communication with the benchmark module and analyzing, by operation of a processor of an analysis module in communication with the survey module, the results of answers to the automatically selected tagged questions by comparing responses against the minimum threshold scores and maximum threshold scores of the selected psychometric behavioral characteristics and recording variance data associated therewith.

2. The method of claim 1, further comprising a pattern library including sets of data, job descriptions, job postings and benchmarks unique to a particular employer, wherein the benchmark is stored and further comprising an employer interface module in communication with the survey module, wherein the employer interface module provides selectable access to data regarding particular employment positions.

3. The method of claim 1, wherein the questions within the electronic library of questions further comprise question grouping tags.

4. The method of claim 3, wherein the step of automatically generating a test further includes restricting question selection based on question grouping tags.

5. The method of claim 1, further comprising providing a benchmark library including electronic records of an array of benchmarks against which the analysis module may compare an individual and automatically applying automatically selected questions associated with each of the array of benchmarks to the individual.

6. The method of claim 1, further comprising automatically generating a report that details the analysis of the individual with respect to the employment position.

7. The method of claim 1, further comprising modifying the benchmark based on real-time employment data from an employer, including real-time employee performance data and data regarding hiring and firing of employees within an employee pool associated with a particular benchmark.

8. The method of claim 1, wherein the step of applying the automatically selected questions to an individual is served over a network via communication module functionally coupling the survey module and the user interface module.

9. The method of claim 8, further comprising storing the benchmark, and the variance data within a pattern library unique to a particular employer.

10. The method of claim 9, further comprising providing a benchmark library including electronic, records of an array of benchmarks against which the analysis module may compare an individual and automatically applying automatically selected questions associated with each of the array of benchmarks to the individual.

11. The method of claim 10, further comprising automatically generating a report that details the analysis of the individual with respect to the employment position.

12. The method of claim 11, further comprising modifying the benchmark based on real-time employment data from an employer, including real-time employee performance data and data regarding hiring and firing of employees within an employee pool associated with a particular benchmark.

\* \* \* \* \*